J. P. BALL
SEWAGE PURIFIER.
APPLICATION FILED OCT. 9, 1919.

1,410,358.

Patented Mar. 21, 1922.

Witnesses,

Inventor.
John P. Ball.

UNITED STATES PATENT OFFICE.

JOHN P. BALL, OF CHICAGO, ILLINOIS.

SEWAGE PURIFIER.

1,410,358.  Specification of Letters Patent.  Patented Mar. 21, 1922.

Application filed October 9, 1919. Serial No. 329,559.

*To all whom it may concern:*

Be it known that I, JOHN P. BALL, a citizen of United States, residing in the city of Chicago, in the county of Cook, in the State of Illinois, United States of America, have invented a certain new and useful Improvement in Sewage Purifiers, of which the following is a specification.

This invention relates to a device for separating, purifying, classifying, treating or collecting sewage by utilizing a fluid current and aims to provide certain improvements therein.

My invention provides improvements especially applicable to devices of this general character and in its preferred form it utilizes a sludge collecting chamber, an initial agitator and aerating means comprising a blower supplying air to the sludge to be treated, a discharge opening in conjunction with a collector consisting of a plurality of superimposed annular conical receiving chambers, a reverse return passage for each receiving chamber, and a final air discharge column, all of which will be herein more fully set forth.

Figure 2:
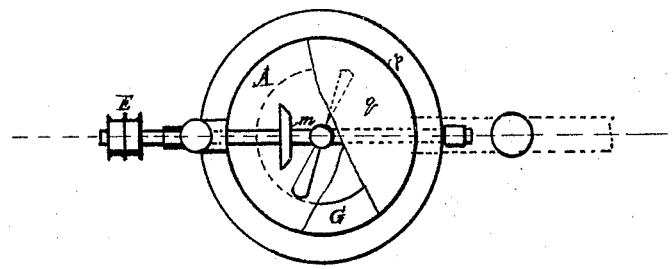
Figure 2 is a top plan view of the preferred form of my invention, portion of the top or covering means being broken away so as to show the internal mechanism.

Referring to the drawings, A indicates a sludge collecting chamber, an intake pipe B supplying the sludge to be treated, the chamber being in turn provided with a revolvably mounted agitator C, and also provided with a fan or blower D, the agitator and fan being intended to produce by combined action a fluid current of aerated sludge. E represents the power-imparting mechanism whereby the air forcing means and agitating means may be operated. F is an annular discharge passage conical or of nozzle form through which the current passes. G is a collecting member consisting of a plurality of conical shaped receiving chambers, each chamber having a suitable exposed surface so as to receive and collect the suspended matter from the sludge laden fluid current. H is the final exhaust passage outlet whereby the noxious gases generated may be liberated and discharged into the atmosphere at an elevated plane preferably above the house top.

Figure 1:
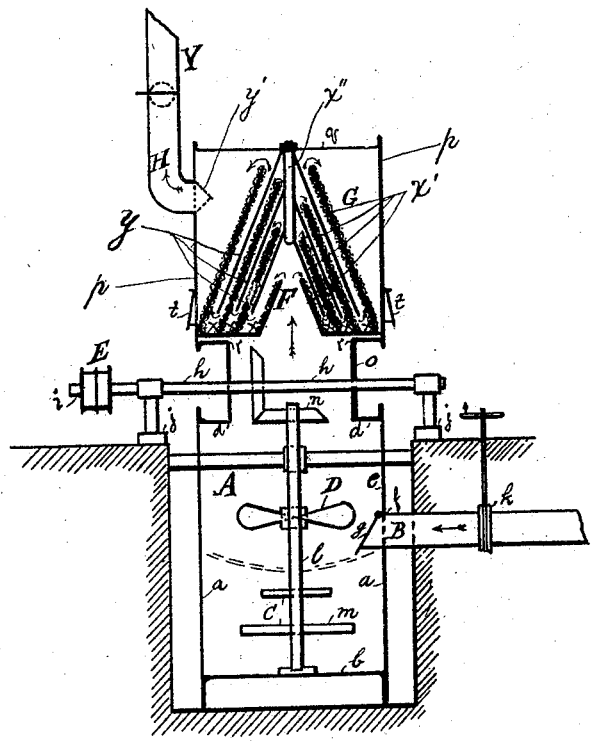
Figure 1 is a vertical cross-sectional view of the preferred form of my invention.

Referring to Figure 1, I will now describe in detail the preferred form of my invention. The sludge chamber A has a cylindrical body "$a$", a closed flat bottom "$b$" and a flat annular open top "$d$". The body, top and bottom are bolted or riveted together to form a receiving chamber for the liquid sludge. The supply pipe B is preferably an iron pipe entering the chamber through an opening in the casing at "$f$." This intake pipe is provided with a check valve "$g$" at the point of contact. Where the intake pipe enters the casing is a sealed joint so as to form an air tight connecting joint. The driving mechanism E shown consists of a driving shaft "$h$" carrying fast and loose pulleys and geared to the driven parts by bevel gears. This shaft is mounted in bearings in the frame "$j$", which frame is shown as crossing the machine and supported on the concrete base at each side thereof, and the entire mechanical operating device as shown is suspended from the frame, which has one face coinciding with the diametric parting of the body. The agitator C is preferably a plurality of circular plates "$m$" mounted and keyed to the shaft "$l$". The fan shaped blower D is also mounted and keyed to the shaft "$l$." The blower and the agitator revolve with the shaft "$l$" by means of the geared wheels at "$n$". The collecting chamber G is a casing constructed preferably of sheet metal, riveted so as to make air tight joints. It has a cylindrical body "$p$" with a flat top and bottom "$q$" and "$r$" respectively. The sides of the chamber are provided with hinged doors "$t$" so as to permit the collected sludge to be exuded or withdrawn. The connecting chamber F is centrally located between the aerating and the collecting chambers and forms a free passage thereto. It is constructed preferably of sheet metal riveted so as to form a cylindrical or conical body. The three chambers may be bolted together by iron rods so as to form one continuous casing.

The collector is preferably a stationary member. It comprises a plurality of concentric conical cups, each cup being separated by a series of baffles, each baffle being molded so as to form a symmetrical mesh of the whole. The concentric cups are lettered "$x$" and the respective baffles are lettered "$x'$". The baffle members $x'$ are also somewhat in the nature of cones with the apexes thereof preferably secured to a single rod or member $x''$ which is removably secured and depends from the top member $q'$ of the collecting chamber G. With this construction, it is evident that when the top of the chamber is removed, all of the baffle members likewise will be withdrawn from their telescopic relation with the cup members, thus permitting access to the baffles and the cup members for cleaning and repair. The cups and baffles in place form the reverse and return passages "$y$".

The surface of the cups and baffles is covered with a suitable material to collect the atoms from the sludge laden fluid current. In the preferred form of my invention a fibrous material such as cheese cloth is used as a covering for the said cups and baffles.

The baffle conical shaped cups are preferably constructed of fibrous material suitable to collect the suspended matter in the fluid current.

The final exhaust chamber H is constructed preferably of sheet metal and in the form of a cylindrical stack, the top or outlet being preferably located at an elevated plane and the stack forms a continuous chamber from the aerating chamber to the outlet. In this exhaust chamber a damper is constructed by the disk I which regulates the exhaust current.

At a point of connection between the exhaust chamber and the aerating chamber a conical shaped screen $y'$ of wire mesh is constructed so as to intercept any remaining atoms passing through the collector.

By shutting off the supply of sewage and by continuing the blower, the collected sludge may be air dried in the receiving cups.

It will be understood that the invention is not limited to the particular details of construction, arrangement and combination set forth, as it can be employed in whole or in part according to any modifications.

It will be understood that by closing the valve $k$ the flow of sludge into the basin A is shut off. The fan D is then set in operation and in time the sludge in the basin A will be dissipated and lodging in the mesh $x$ and $y$ of the chamber G, will be dried by a circuitous current of air from the continuous revolutions of the fan D. The valve $k$ being then opened the operation is repeated.

What I claim is:

1. A device for treating sewage, comprising a sludge-receiving receptacle, agitating and aerating means mounted in said receptacle, a collecting chamber arranged in communication with said receptacle, said collecting chamber being formed to provide a circuitous pan for the aerated matter, and a vent leading from said collecting chamber.

2. A device for treating sewage, comprising a plurality of chambers, means for supplying liquid sludge to one of said chambers, means for creating an air current in said chambers whereby the liquid sludge is aerated and caused to flow through the chambers, means arranged in the second chamber for collecting the aerated liquid, and means whereby the collected matter may be discharged from said second chamber.

3. A device for treating sewage, comprising a plurality of chambers arranged at different horizontal levels and in communication with one another, means for supplying the liquid to be treated to one of said chambers, means for aerating the liquid in said chamber and causing it to pass into a second chamber, means arranged in said second chamber for collecting the aerated liquid passing through the second chamber, means for drying the collected matter.

4. In a device for treating sewage, the combination of a receiving chamber for liquid sludge, means for agitating the sludge and creating an air current in said chamber whereby the sludge is aerated, and means whereby the aerated liquid is made to travel in a circuitous path, said means being arrangd to collect entrained particles.

5. A device for treating sewage, comprising a sludge-receiving chamber, a second chamber disposed on the first mentioned chamber and in communication therewith, means for inducing an upflow of current from the first mentioned chamber through the second mentioned chamber, a series of concentrically arranged conical cups, a series of concentrically arranged conical members nesting with said cups whereby the current is given a circuitous path, and means arranged along said path of the current for collecting and drying the entrained particles.

6. A device for treating sewage, comprising a sludge-receiving chamber, a second chamber mounted on the first mentioned chamber and in communication therewith, means rotatably mounted in the first mentioned chamber for agitating the sludge and to induce aeration thereof, the second mentioned chamber being provided with a series of concentrically arranged conical cups secured to the bottom of said second chamber, the top of said second mentioned chamber being provided with a depending member, a series of concentrically arranged baffle members all secured to said depending members and telescoping with said cup members whereby the aerated sludge is forced to flow through a vertically disposed circuitous path, and means for controlling the air current through said chambers.

7. A device for treating sewage, comprising a sludge-receiving chamber, agitating and air current-inducing means rotatably mounted in said chamber, a second chamber mounted on the first chamber and in communication therewith, said second chamber being provided with a vent or air conduit, a plurality of concentrically arranged conical members, a portion of said members being inverted and nesting with the other portions of said members and arranged intermediate of the point of communication of the second chamber with the first chamber and said air conduit, and means disposed on the opposing surfaces of the conical members for collecting the entrained matter in said current, and means whereby the collected matter may discharge from said second mentioned chamber.

In witness whereof, I have hereunto signed my name in the presence of two subscribed witnesses.

JOHN P. BALL.

Witnesses:
 LEE M. BALL,
 C. E. BALL.